US012785967B2

(12) United States Patent
Gaur et al.

(10) Patent No.: US 12,785,967 B2
(45) Date of Patent: Nov. 3, 2026

(54) USER VERIFICATION STATE SHARING FOR PRINCIPAL-AGENT-BASED SESSION MANAGEMENT

(71) Applicant: T-MOBILE INNOVATIONS LLC, Overland Park, KS (US)

(72) Inventors: Tanmaya Gaur, Kirkland, WA (US); Suman Bethi, Issaquah, WA (US); Sri Lakshmi Narasimha Charan Teja Reminisetty, Bellevue, WA (US); Valeri Lane Reeves, Seattle, WA (US); Timothy Adam Shelton, North Bend, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 105 days.

(21) Appl. No.: 19/018,404

(22) Filed: Jan. 13, 2025

(65) Prior Publication Data

US 2026/0205294 A1 Jul. 16, 2026

(51) Int. Cl.
*H04L 9/32* (2006.01)

(52) U.S. Cl.
CPC .................................. *H04L 9/3213* (2013.01)

(58) Field of Classification Search
CPC ..................................................... H04L 9/3213
See application file for complete search history.

(56) References Cited

U.S. PATENT DOCUMENTS 6,041,357 A * 3/2000 Kunzelman ......... H04L 63/0815 726/20
10,951,652 B1 * 3/2021 Sharifi Mehr ...... H04L 63/0807
2002/0002688 A1 * 1/2002 Gregg ..................... H04L 63/08 726/3
2003/0188193 A1 * 10/2003 Venkataramappa ......................... H04L 63/0815 726/10

(Continued)

OTHER PUBLICATIONS

Grand, J., "Authentication Tokens: Balancing the Security Risks with Business Requirements", atstake. Inc, Sep. 19, 2001. pp. 1-12.

(Continued)

*Primary Examiner* — Darren B Schwartz
(74) *Attorney, Agent, or Firm* — Shook, Hardy & Bacon L.L.P.

(57) ABSTRACT

In various embodiments, systems and methods for user verification state sharing for principal-agent-based session management are provided. In some embodiments, a user verification state sharing process based on server-side logic and a session metadata database tier is provided that addresses sharing session context metadata securely without repetitious user reauthentication. Session context metadata may be managed using an API-based contextizer that maintains a database of session context metadata for active sessions corresponding with an authenticated principal user. Based on session context metadata, an IDP can serve a token generation code to one or more applications (on either a principal user's or agent user's devices) that may be used to locally generate the token used to establish a verified session (Continued)

for the principal user. The contextizer may operate as a gateway to the session metadata database to manage the reading and writing of session metadata.

20 Claims, 12 Drawing Sheets

(56) References Cited

U.S. PATENT DOCUMENTS

| | | | | |
|---|---|---|---|---|
| 2008/0002695 | A1* | 1/2008 | Klotnia | H04L 63/102 370/392 |
| 2012/0226813 | A1* | 9/2012 | Ragusa | G06F 9/5027 709/227 |
| 2016/0337351 | A1* | 11/2016 | Spencer | H04L 63/0876 |
| 2017/0195426 | A1* | 7/2017 | Tanaka | G06F 21/335 |
| 2021/0312251 | A1* | 10/2021 | Teller | G06K 19/06046 |
| 2021/0385210 | A1* | 12/2021 | Olden | H04L 63/0892 |
| 2025/0211589 | A1* | 6/2025 | Hanwella | H04L 63/0846 |

OTHER PUBLICATIONS

Jukic et al., "Improving E-Business Customer Relationship Management Systems with Multilevel Secure Data Models", Proceedings of the 35th Hawaii International Conference on System Sciences, 2002, 10 pages.

Lee et al., "Reliable Cascaded Delegation Scheme for Mobile Agent Environments", School of Information and Communication Engineering, 2004, pp. 55-68.

Lee et al., "TBAS: Token-based authorization service architecture in Internet of things scenarios", International Journal of Distributed Sensor Networks, vol. 13, No. 7, 2017, pp. 1-14.

Light, B., "A Review Of The Issues Associated With Customer Relationship Management Systems", The 9th European Conference on Information Systems, Jun. 27-29, 2001. pp. 1232-1241.

Moon et al., "Privilege Management System in Cloud Computing using Oauth", International Journal of Security and Its Applications, vol. 8, No. 3, May 2014, 15 pages.

Radosavljevic er al., "Why is Customer Support a Target For Hackers?", Available at : <https://helpy.io/blog/why-is-customer-support-a-target-for-hackers/>, Oct. 14, 2020, pp. 1-7.

Schink et al., "Security and Trust in Open Source Security Tokens", IACR Transactions on Cryptographic Hardware and Embedded Systems, vol. 2021, No. 3, Jul. 9, 2021, pp. 176-201.

Suzic, B., "User-centered Security Management of API-based Data Integration Workflows", IEEE/IFIP Dissect, Apr. 29, 2016, pp. 1-25.

Varma et al., "Enhanced Identity Management System Based Secured Framework in Cloud Authorisation Environment", South Asian Journal of Engineering and Technology, vol. 2, No. 7, 2015, pp. 19-24.

* cited by examiner

USER VERIFICATION STATE SHARING FOR PRINCIPAL-AGENT-BASED SESSION MANAGEMENT

BACKGROUND

Many modern customer care scenarios involve a customer communicating with a customer care representative via a session over a network-based platform that may comprise electronic messaging and/or voice-based communications. With such platforms, the customer may first use an application on a user device to authenticate themselves and receive a credential (e.g., a digital token) that may be used to initiate a session with a customer care representative, which the customer care representative may use to confirm the identity of the customer. Once a customer is verified, the context of interactions between the customer service agent and a system of records, including authentication and authorization of which customer was verified by which agent, can be secured using security tokens that serve as proof of authentication to confirm that the customer service agent has successfully authenticated as an agent authorized to access the user data profile from the system of records.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In contrast to prior technologies, embodiments of the present disclosure provide for a user verification state sharing process based on server-side logic and a session metadata database tier that addresses sharing session context metadata securely without repetitious user reauthentication with an identification provider (IDP). Session context metadata may be managed using an application programming interface (API)-based contextizer service that maintains a server-side session database of session context metadata for active sessions corresponding with an IDP authenticated principal user. Based on the session context metadata for an active session, an IDP can serve a token generation code (e.g., a hash code convertible to a token) to one or more applications (on either a principal user's or agent user's devices) that may be used to locally generate the token used to establish a verified session for the principal user. In some embodiments, an API-based validation framework may include a framework of validation services that include, but are not limited to, an agent identity provider, and a session validation function that includes a principal validation API and/or a principal identity provider. The session validation function may further include a contextizer that operates as a gateway to the session metadata database as described herein, to manage the reading and writing of session metadata.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1A:
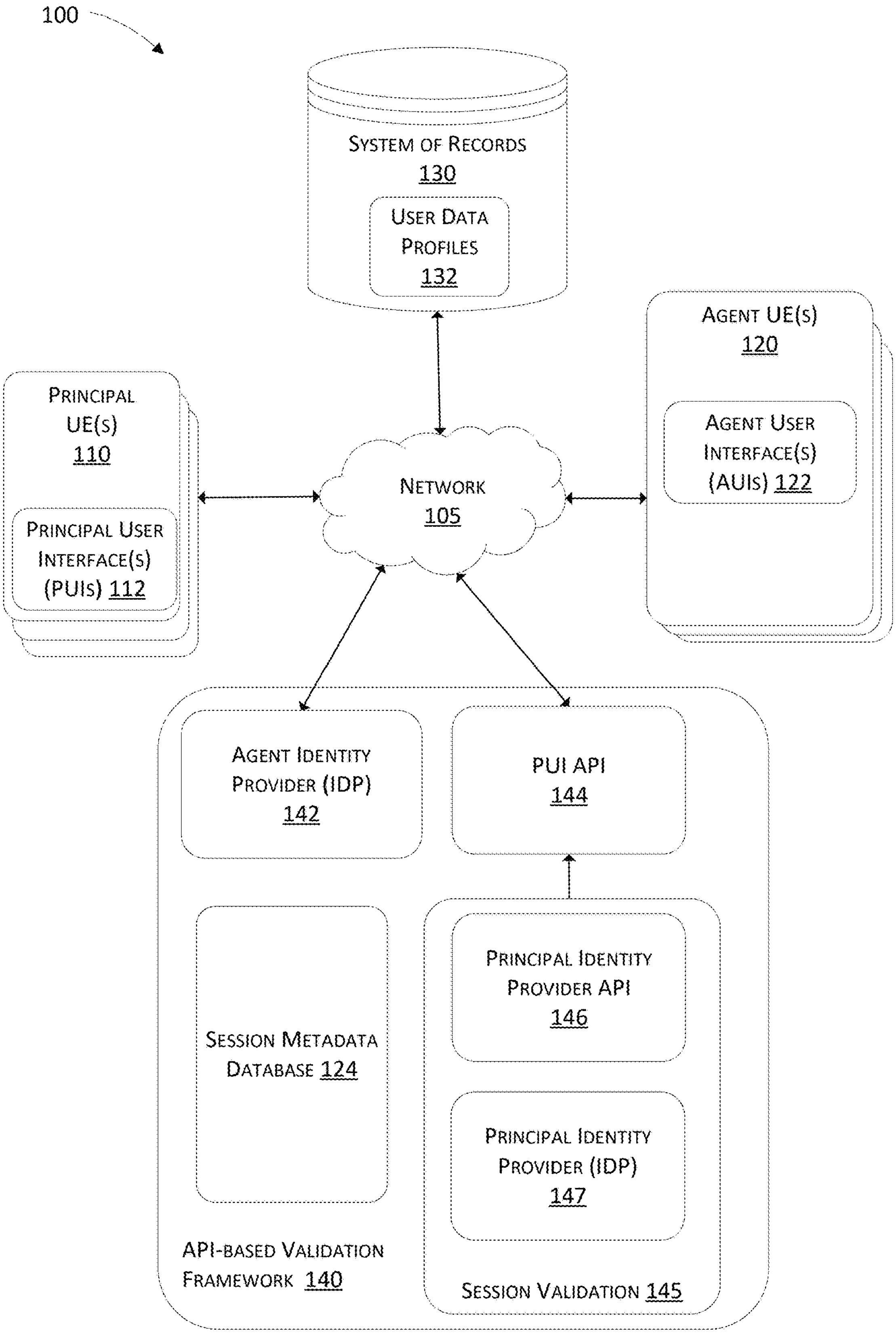
FIGS. 1A and 1B are diagrams illustrating an example operating environment comprising a validation framework for user verification state sharing, in accordance with some embodiments.

Embodiments of the present disclosure provide for user verification state sharing for principal-agent-based session management. In traditional internet-based customer support interactions, communication with customer care agents typically involves point-to-point exchanges over a single channel. In such interactions, a customer authenticates via an identification provider (IDP) service to obtain a user token, which is then used to establish a verified session with the customer care agent through a communication platform. IDPs are an example of a service that manages and authenticates user identities. IDPs handle the process of verifying who a user is and providing the necessary credentials for accessing various applications, data records, and services. When a user (e.g., a principal user or an agent user) authenticates themselves with an IDP, the IDP may issue a token (or a hash code convertible into a token) that provides the user with credentials (e.g., Open Authorization (OAuth) 2.0-based credentials) that the user may use to access one or more services and/or systems. These tokens may contain information about the user, such as but not limited to, an identification of the user, and may be used in OpenID Connect (OIDC) frameworks (e.g., Internet Engineering Task Force (IETF) Request for Comments (RFC) 6749 and 6750) to provide user profile information. Tokens obtained from authentication with an IDP may be stored locally on a user's device. The tokens may remain valid for a predetermined duration, for example, for the duration of a session between an application and a service.

However, modern customer care interactions often deviate from this straightforward process, incorporating more complex scenarios. For instance, a customer might need to switch between applications on their device (e.g., from a general text messaging app to a vendor-specific app) or initiate a session with one customer care agent who then needs to transfer the customer to another agent for further assistance. In these cases, a challenge arises in transferring the user's token to the new application or agent's device without requiring the customer to reauthenticate with the IDP for each hand-off. While peer-to-peer token transfer schemes have been proposed (e.g., carrying a user token as a message payload), these schemes are vulnerable to security threats such as token theft, message snooping, and network node spoofing, which can involve unauthorized reading, modifying, or deleting of transmitted data without the sender's or receiver's knowledge.

In contrast with these prior verification schemes, embodiments of the present disclosure provide for a user verification state sharing process based on server-side logic and a database tier that addresses sharing session context metadata securely without repetitious user reauthentication with the IDP. As described herein, in some embodiments, session context metadata may be managed using an API-based contextizer service that maintains a server-side session database of session context metadata for active sessions corresponding with an IDP authenticated principal user. Based on the session context metadata for an active session, an IDP can serve token generation code (e.g., a hash code convertible to a token) to one or more applications (on either the principal user's or agent user's devices) that may be used to locally generate the token used to establish a verified session for the principal user.

FIG. 1A is a diagram illustrating an example network operating environment 100, in accordance with some embodiments described herein. As shown in FIG. 1A, operating environment 100 comprises one or more principal user equipment (UE) 110, one or more agent UEs 120, a system of records 130 storing user data profiles 132 (e.g., user data profiles associated with the principal users using the UE 110), and an API-based validation framework 140.

A principal user's UE 110 and agent user's UE 120 may comprise any form of computing device comprising, such as, but not limited to, workstations, desktop computers, laptop computers, smart phones, tablets, handheld and/or wearable computing devices, personal digital assistants, a fitness tracker, or any other device capable of communicating using one or more resources of the network 105. The terms "user equipment," "UE," and/or "user device" are used interchangeably to refer to a device employed by an end user that communicates using a network, such as network 105. UE 110 and UE 120 may include components such as software and hardware, one or more processors (e.g., processing circuitry), a memory, a display component, a power supply or power source, a speaker, a touch-input component, a keyboard, and the like. The processor may comprise processing circuitry and be programmed to execute code to implement one or more of the functions of the UE 110 and UE 120 described herein.

More specifically, the UE 110 for a principal user may execute one or more software applications that implement a principal user interface (PUI) 112 that may be used by a principal user to interface with and/or perform transactions via network 105 with an agent user of a UE 120 for an agent user. A UE 120 for an agent user may execute one or more software applications that implement one or more agent user interfaces (AUIs) 122 that an agent may use to interface with and/or execute one or more transactions via network 105 with the principal user of a UE 110. In some embodiments, AUIs 122 may be used to obtain access (e.g., via network 105) to one or more user data profiles 132 hosted by a system of records 130. Each of the principal user UE 110 and agent user UE 120 may comprise a wired or wireless network interface through which they communicate via the network 105. The at least one network 105 may include any form or combination of wired or wireless communication networks including, but not limited to, a cellular communications network (e.g., a 5G telecommunications network), one or more prior access technology networks (e.g., Long-Term Evolution (LTE)), and/or the Internet.

The system of records 130 may comprise a data store, database, server, and/or other computing platform that executes at least one service that provides access to user data profiles 132 associated with a principal user (e.g., customers, account owners, etc.). In some embodiments, the system of records 130 represents a customer relationship management (CRM) system. As the terms are used herein, a "data profile," "user data," "user data profile," "user profile," or "profile data" are used synonymously and may comprise an account, ledger, database, and/or other data having, for example, personal, financial, medical, educational, or other records and/or histories associated with a principal user. Access to the user data profiles 132 on a system of records 130 is secured such that the principal user does not directly interface with the system of records 130 or their respective user data profile 132. Instead, a user works through an agent operating an agent UE 120 in order to access, update, or otherwise execute one or more transactions that involve or use the data in the user data profile 132.

For one or more of the embodiments described herein, an agent uses one or more of the AUIs 122 to issue API calls to obtain access to the user data profiles 132. AUIs 122 may include applications hosted on a UE (e.g., a website browser or a native client application) that may be used to access information from a network server. The authorization for the AUIs 122 to issue API calls to access the user data profiles 132 and/or services of the system of records 130 may be managed at least in part by authentications and/or credentials obtained via the API-based validation framework 140 and/or using a server-side session metadata database 124 that stores session context metadata (e.g., credential data, tokens, and/or other metadata) corresponding to interaction sessions associated with one or more principal users. As further discussed herein, the API-based validation framework 140 may include a framework of validation services that includes, but is not limited to, an agent identity provider (agent IDP) 142, a PUI API 144, and a session validation function 145 that includes a principal IDP API 146 and/or a principal identity provider (principal IDP) 147. The session validation function 145 may further include a contextizer 148 that operates as a gateway to the session metadata database 124 as described herein, to manage the reading and writing of session metadata. The API-based validation framework 140 and/or session metadata database 124 may comprise network services hosted on one or more network servers and/or cloud computing platforms, which may be accessed via network 105. That is, the various functions of the API-based validation framework 140 described herein may be implemented using one or more processors (e.g., processing circuitry) to perform one or more of the functions of the API-based validation framework 140.

Figure 1B:
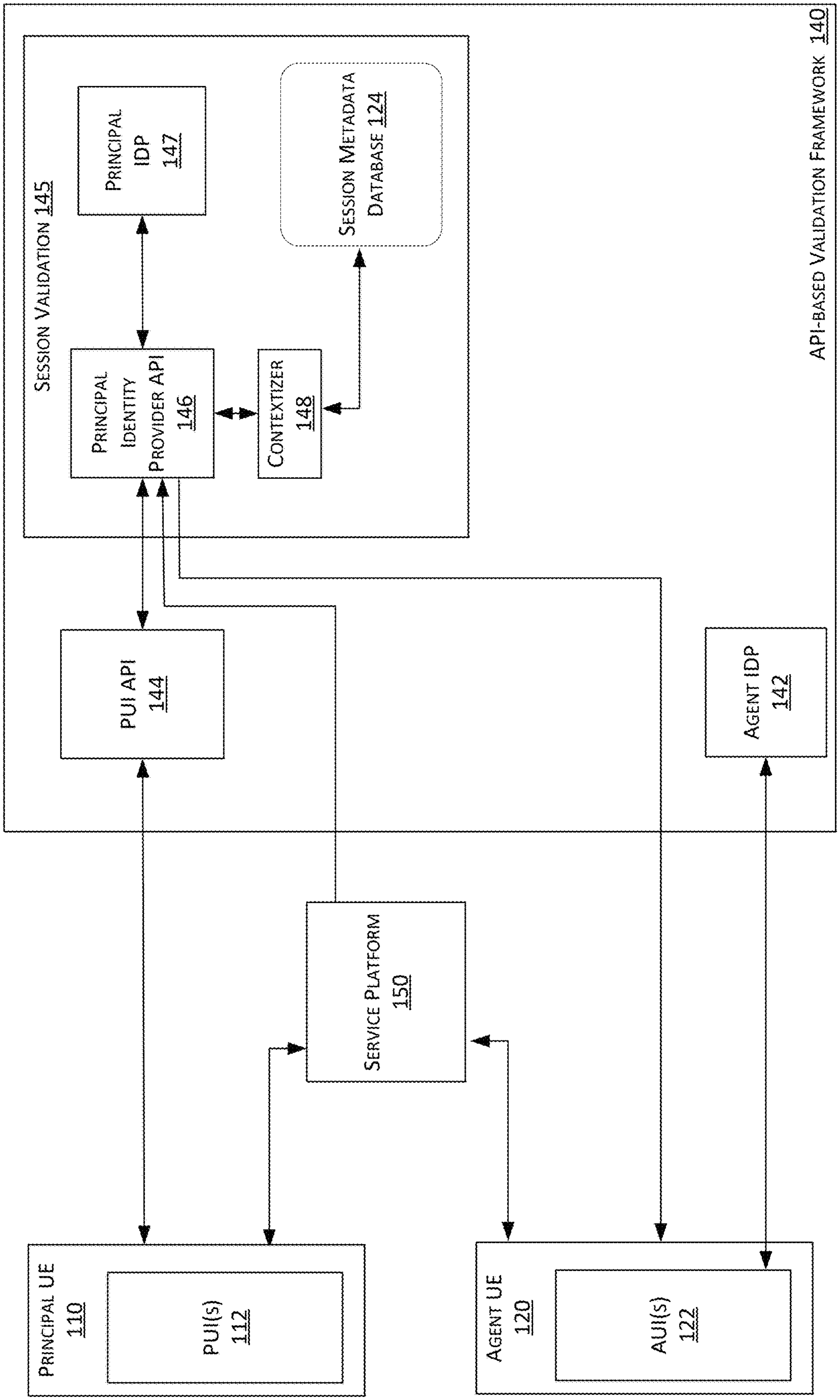

FIG. 1B is a diagram illustrating an example configuration for establishing an interaction session via a service platform 150 between a PUI 112 executed by a principal UE 110 and an AUI 122 executed by an agent UE 120. The service platform 150 may comprise one or more cloud computing platform hosted server applications that establish network-based communication channels between UEs such as principal UE 110 and agent UE 120 (e.g., a text messaging platform, voice and/or data communication platform, conferencing platform, proprietary customer care platform, and/or other platforms and/or services). The data flow in FIG. 1B may be described more particularly with respect to the example data flow diagrams illustrated in FIGS. 2A-2C. In some embodiments, the user verification state sharing process described herein as illustrated in FIGS. 2A-2C provides for sharing session context metadata securely without repetitious user reauthentication with an IDP.

Figure 2A:
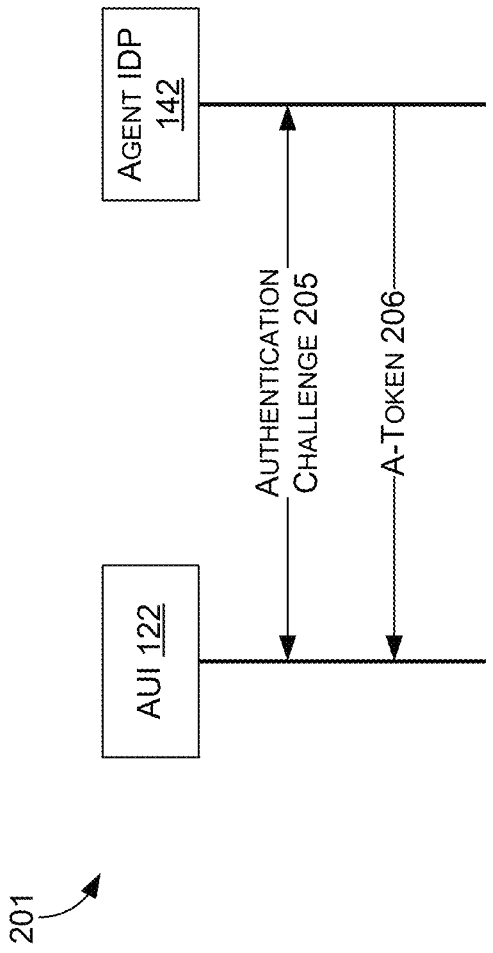
FIGS. 2A-2C are data flow diagrams illustrating user verification state sharing via a session metadata database, in accordance with some embodiments.

As shown starting with FIG. 2A at 201, for an agent to be able to assist a principal, the agent may first authenticate themselves using the agent IDP 142 to obtain an agent token, referred to herein as an a-token. The agent proceeds through an authentication challenge 205 with the agent IDP 142, which may include, for example, a user identification and passcode challenge, a secret key exchange, a response to a push code presented on the UE 120, and/or other authentication handshake processes. In response to successfully completing the authentication challenge 205, the AUI 122 receives an a-token 206 from the agent IDP 142, which the agent may then proceed to use to authenticate themselves to other network services.

Figure 2B:
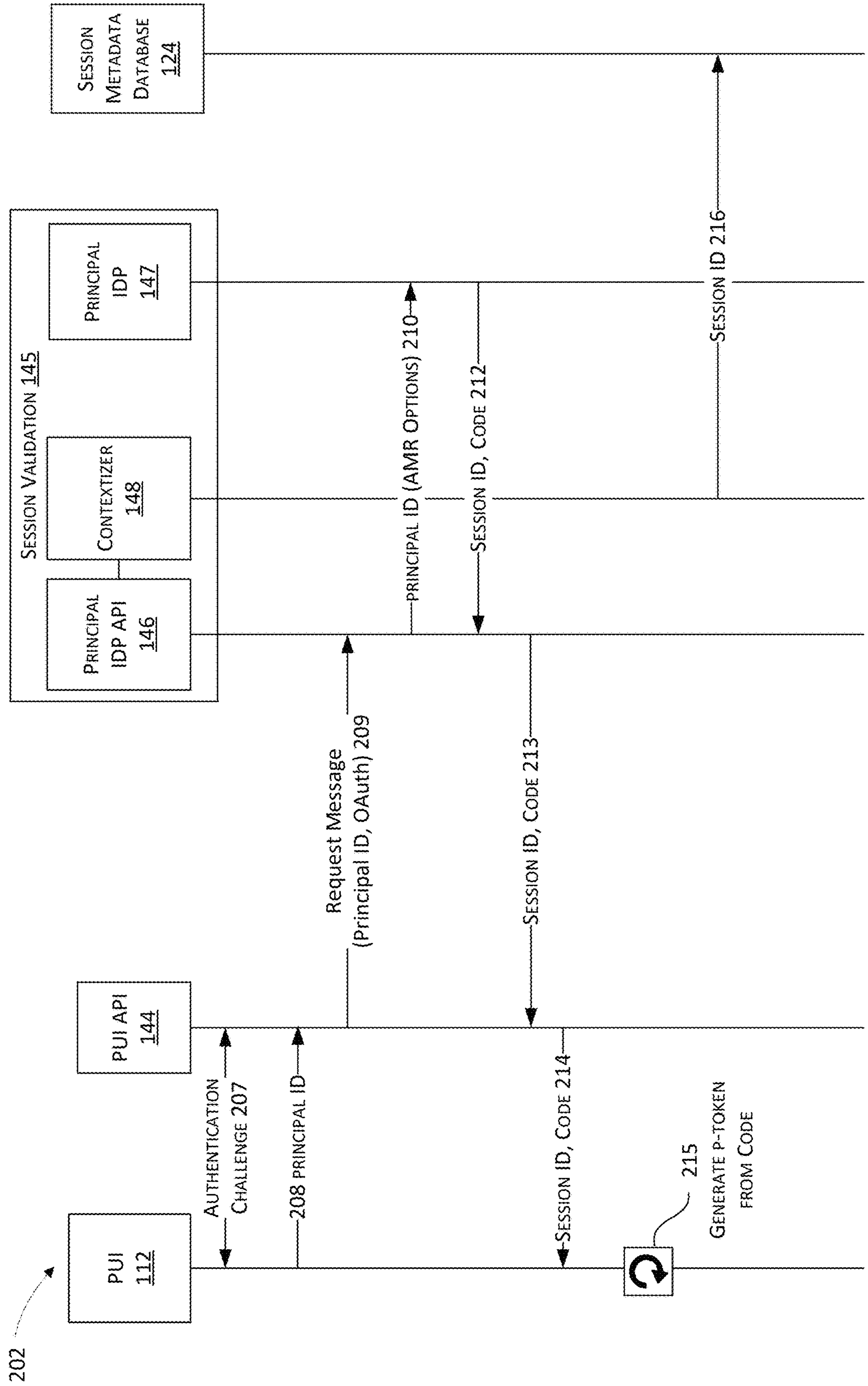
Figure 2C:
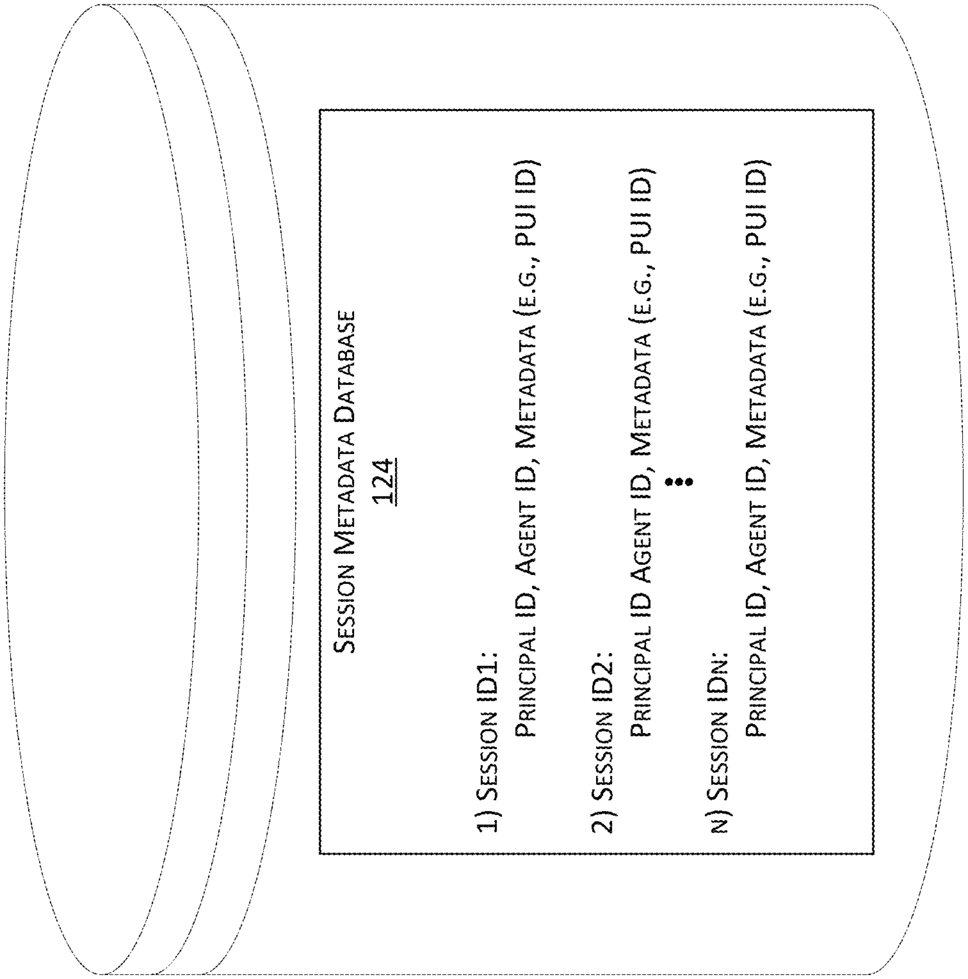

With reference next to FIG. 2B generally at 202, for the principal user (e.g., a customer) to establish authenticated communications with the agent user, the principal user authenticates their identity with the principal IDP 147 to obtain a principal identification (ID) token, referred to herein as a p-token. To commence authentication of the principal user, the PUI 112 of the principal user's UE 110 may proceed through an authentication challenge 207 with the PUI API 144 of the API-based validation framework 140. The authentication challenge 207 may include, for example, a user identification and passcode challenge, a secret key exchange, a response to a push code presented on the UE 110, and/or other authentication handshake processes. The PUI 112 may further communicate to the PUI API 144 a principal ID (shown at 208) associated with the principal user. The principal ID 208 may include a combination of data that uniquely specifies the identity of the principal user. For example, the principal ID may include, as non-limiting telecommunication scenario examples, an Authentication Methods Reference (AMR), a Mobile Station International Subscriber Directory Number (MSISDN), a personal identification number (PIN), and/or another identifier such as an identifier tied to a billing account number (BAN). The principal ID may include other forms of identifying data for non-telecommunication scenarios.

With the principal agent authenticated, the PUI API 144 has the principal ID and may proceed to request a p-token that will be used for authenticating interactions and establishing an interaction session (with a session ID) with the AUI 122. This part of the process commences with the PUI 112 communicating the principal ID (e.g., principal user credentials) to the PUI API 144 as shown at 208. The PUI API 144 may proceed to obtain a p-token by initiating a request message 209 to the session validation function 145, wherein the request message 209 includes the principal ID and may include OAuth credentials obtained from the authentication challenge 207. The request message 209 may be received at the principal IDP API 146, and proceed to validate the OAuth. If the principal IDP API 146 validates the OAuth, principal IDP API 146 may provide the principal ID to the principal IDP 147 as a credential for the principal user as shown at 210. In some embodiments, when the principal ID comprises an AMR, the AMR and one or more AMR options may be provided to the principal IDP 147 as a credential for the principal user. The principal IDP 147 may perform one or more verifications to check that the provided principal ID is valid (e.g., based on confirming the principal ID against a database of valid principal IDs). When the principal ID is confirmed as valid, the principal IDP 147 establishes an interaction session that is assigned to the principal user. As shown at 212, the principal IDP 147 may then return a session ID and a code to principal IDP API 146 (where the code is a token code that may be used by the PUI 112 to generate the p-token). The code is issued specific to the principal user and tied to that user, and may include one or more security mechanisms. For example, in some embodiments the code may be encoded with an identity of the user that initiated the request message 209. In some embodiments, the p-token may indicate a scope of granted access to the system of records 130 (e.g., which profiles and/or which fields of a user data profile 132 may be accessed).

In some embodiments, the session ID and code may be forwarded by the principal IDP API 146 to the PUI API 144 (shown at 213), which forwards the session ID and code to the PUI 112 (shown at 214). The PUI 112 receiving the code and session ID may convert the information into a PUI p-token (shown at 215) that may be used to establish interaction sessions, for example, via the service platform 150 with one or more AUIs 122.

In some embodiments, based on the session ID, the principal IDP API 146 and/or contextizer 148 may also forward the session ID to the session metadata database 124 (shown at 216) to generate a session object on the session metadata database 124 for storing the session ID and an initial set of session metadata. In some embodiments, the initial set of session metadata may comprise data associated with the PUI 112, such as an application ID. For example, an application ID may indicate if the PUI 112 is a messaging application, a special purposes client service application, a web browser application (e.g., Chrome, Edge, and Safari), a conferencing application (e.g., Zoom, Teams, etc.) and/or another application. In some embodiments, the initial set of session metadata may indicate a particular protocol, framework, communications parameters, or the like, that may be used to establish a session and/or communicate with the PUI 112.

FIG. 2C illustrates a non-limiting example data structure for a session metadata database 124. As discussed herein, the session metadata database 124 provides a server-side database (e.g., hosted by a cloud computing platform and/or network server) where session metadata for a plurality of distinct sessions may be stored. As indicated in FIG. 2C, the session metadata stored by the session metadata database 124 may include session data associated with one or more different principal IDs, and/or any may store metadata for one or more distinct sessions associated with each principal ID. Having session data stored in the session metadata database 124 permits an agent user's AUI 122 to obtain the p-token issued to, and associated with, a PUI 112, from a trusted server-side framework, as described below with respect to FIG. 3. AUI 122 may obtain a valid instance of the p-token, facilitating authenticated communication between the AUI 122 and PUI 112, as well as using the p-token as an authentication to perform authorized transactions with the system of records 130. Further, the session ID and other metadata stored in the session metadata database 124 may be used to facilitate transfer of an interaction session between principal and agent applications without the principal user having to reauthenticate themselves for each session handoff. For example, by accessing the session metadata database 124, the user of the principal UE 110 may hand off an interaction session from a first PUI 112 application to a second PUI 112 application based on API calls to the session validation function 145, and/or the user of the agent UE 120 may hand off an interaction session from a first AUI 122 application to a second AUI 122 application based on API calls to the session validation function 145. Moreover, a first AUI 122 of a first agent's UE 120 may hand off an interaction session to a second AUI 122 application of a second agent's UE 120. Each of such example handoffs may be completed without the principal user having to reauthenticate themselves with the principal IDP 147 to authorize a new p-token.

Figure 3:
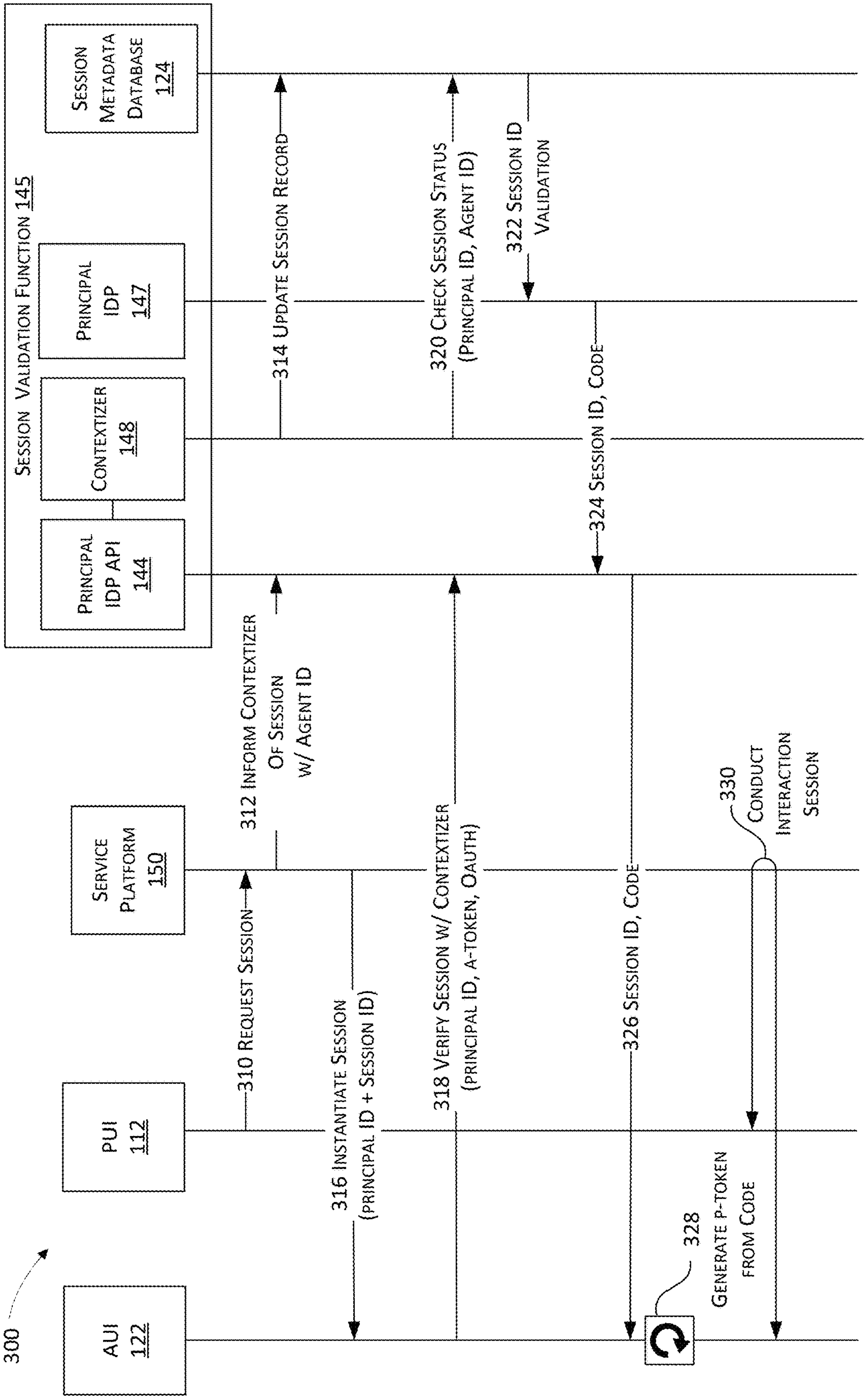
FIG. 3 is a diagram illustrating an example message exchange process for user verification state sharing using a session metadata database, in accordance with some embodiments.

Turning now to FIG. 3, FIG. 3 illustrates a data flow diagram 300 for a process for delivering a principal user's p-token (e.g., obtained by a principal user as described in FIGS. 2A-2C) to an AUI 122 of an agent UE 120 using the session metadata database 124, and/or based on one or more API calls to the session validation function 145. As described by this example, AUIs 122 hosted on a UE 120 may obtain the session data and code for obtaining the p-token based on requesting access to a corresponding session ID record in the session metadata database 124.

In some embodiments, the PUI 112 may initiate one or more actions to instantiate an interaction session (e.g., a text messaging session) with the agent's AUI 122, for example, by making one or more API calls to an API of the service platform 150. As shown at 310, the PUI 112 may transmit a session instantiation API call to the service platform 150 which may include, for example, the user's principal ID, the session ID provided to the PUI 112 by the session validation function 145, and/or the p-token generated by the PUI 112 based on the code provided by the session validation function 145. In response, the service platform 150 may determine an agent ID associated with the AUI 122 (which may be, for example, selected based on a roster of available agents, or based on an indication in the session instantiation request 310). The service platform 150 may transmit an API call (shown at 312) to the principal IDP API 146, which instructs the contextizer 148 to update the session object (e.g., session record) for the session ID in the session metadata database 124 (shown at 314). The service platform 150 may provide additional metadata because it knows to which agent the platform is routing the interaction session, so they may provide an agent ID distinct from the a-token. The metadata for the session ID may be updated to include the agent ID that the principal user will interact with, and/or a service ID associated with the service platform 150. As such, the session metadata database 124 for this session ID may be used to confirm that an active session exists where the PUI 112 has been previously authorized and issued a p-token, and that the PUI 112 has indicated that an interaction session has been instantiated by the PUI 112 with a particular agent ID. At this time, the service platform 150 may also communicate with the AUI 122 of the agent, as shown at 316, to instantiate the session with that AUI 122. The session instantiation message 316 may include, for example, the principal ID of the principal requesting the session, and the session ID of the active session that has been established by the session validation function 145 for the PUI 112. At this point, in response to having now been informed of the session instantiation (and the corresponding principal ID), the AUI 122 may verify the session with the contextizer 148—via the principal IDP API—as shown at 318.

In some embodiments, the contextizer 148 may reference an indication of lifetime from the session metadata database 124 to confirm whether the session object (e.g., session record) for the session ID in the session metadata database is valid (e.g., not stale, not expired, and/or has a remaining lifetime greater than a threshold) or stale (e.g., expired and/or does not have a remaining lifetime greater than a threshold) before a token-generating code is transmitted to a UE.

In some embodiments, the session verification request 318 may include the principal ID, the agent's a-token, and/or OAuth credentials for the agent. The principal IDP API may receive the verification request 318 and instruct the contextizer 148 to check the session metadata database 124 (shown at 320) to obtain the session status for a session ID record that has been associated with the principal ID and agent ID. If the session status check determines that such a valid active session ID does exist in the session metadata database 124, then the session metadata database 124 may transmit a session ID validation 322 to the principal IDP 147, which responds with a message to the principal IDP API 146 (shown at 324) that includes the session ID and a code from which the AUI 122 can generate the p-token. The principal IDP API 146 forwards the session ID and code to the AUI 122 (shown at 326), from which the AUI 122 may generate the p-token from the code (shown at 328). Based on the p-token generated at the AUI 122, the AUI 122 now has obtained authenticating credentials for the PUI 112, and the AUI 122 and PUI 112 may establish an authenticated channel 330 through the service platform 150 to conduct an interaction session, and/or perform other transactions of behavior of the principal user, such as accessing user data profiles 132 from the system of records 130 (e.g., user data profiles associated with the principal user of the UE 110 as authorized by the p-token).

Figure 4:
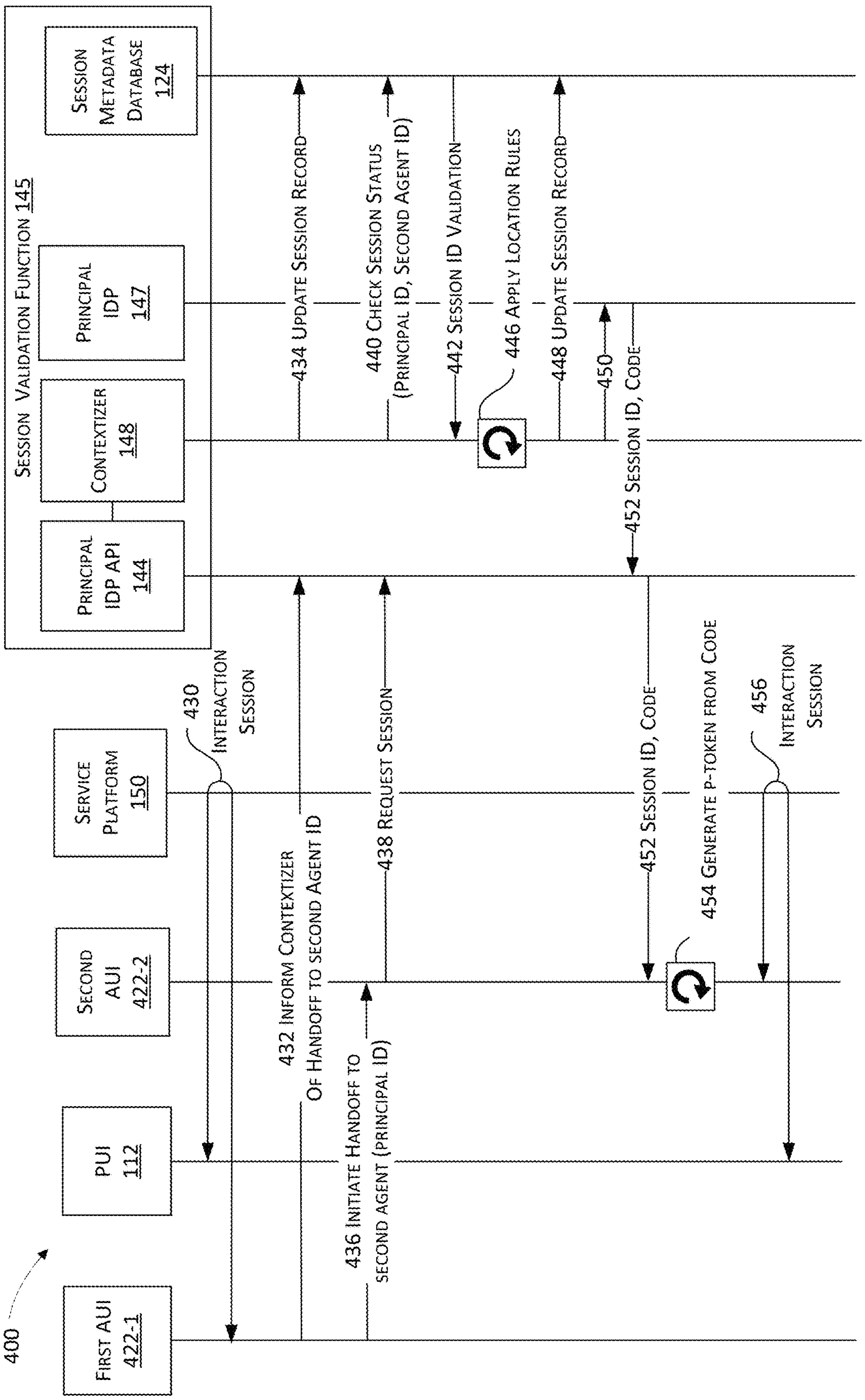
FIG. 4 is a diagram illustrating an example message exchange process for a location-based session handover process using a session metadata database, in accordance with some embodiments.

Turning now to FIG. 4, FIG. 4 illustrates a data flow diagram 400 for a process for an in-facility (e.g., in-store) interaction session handoff scenario. For example, in a retail store use case scenario, a customer (e.g., the principal user), may enter the store, authenticate themselves via a PUI 112 on their UE 110 as illustrated in FIGS. 2A-2B to obtain a p-token, and instantiate a session with a first retail store agent's UE, which provides the AUI 422-1 of the first agent's UE with the p-token (such as described with respect to FIG. 3). However, to complete the customer's request, the first retail store agent may need to hand over the customer to a second retail store agent and therefore need to transfer the p-token from the AUI 422-1 of the first retail agent's UE to an AUI 422-2 of the second retail agent's UE.

As shown in FIG. 4 at 430, a current interaction session may be in place between a first AUI 422-1 and the PUI 112, for example, via the service platform 150. The agent user of AUI 422-1 may need to hand off this session to a second agent user who is using the AUI 422-2 on their respective UE. The AUI 422-1 transmits a handoff message 432 to the principal IDP API 146, to inform the contextizer 148 of the planned handoff, and may provide an agent ID of the second agent. The contextizer 148 may update the session record at the session metadata database 124 (shown at 434) with the agent ID and additional metadata such as location information indicating that the first AUI 422-1 and the second AUI 422-2 are both operating within the same facility (e.g., the same retail store). The AUI 422-1 may also transmit a handoff initiation message (shown at 436) to the second AUI 422-2, informing the AUI 422-2 of the handoff operation and the principal ID of the principal user whose session is being transferred to the second AUI 422-2. The AUI 422-2 receiving the handoff may transmit a session request/validation message 438 to the session validation function 145.

The principal IDP API may receive the session request/validation message 438 and instruct the contextizer 148 to check the session metadata database 124 (shown at 440) to obtain the session status for the session ID record that has been associated with the principal ID and the second agent's ID. If the session status check determines that such a valid active session ID does exist in the session metadata database 124, then the session metadata database 124 may transmit a session ID validation 442 to the contextizer 148. The contextizer 148 may apply location verification rules (shown at 446), for example to confirm that metadata indicates that the first AUI 422-1 and the second AUI 422-2 are both operating on devices (e.g., UE) located at the authorized location (e.g., retail store). If confirmed, the contextizer 148 may update the session record (shown at 448) to record the handover event, and prompt the principal IDP 147 (shown at 450) to send a token generation code to the second AUI 422-2. The principal IDP 147 responds (as shown at 452) with a message to the principal IDP API 146 that includes the session ID and a code from which the AUI 422-2 can generate the p-token. The principal IDP API 146 forwards the session ID and code to the AUI 422-2 (shown at 452), from which the AUI 422-2 may generate the p-token from the code (shown at 454). Based on the p-token generated at the AUI 422-2, the AUI 422-2 now has obtained authenticating credentials for the PUI 112, and the AUI 422-2 and PUI 112 may establish an authenticated channel through the service platform 150 to conduct an interaction session 456, and/or perform other transactions of behavior of the principal user, such as accessing user data profiles 132 from the system of records 130 (e.g., user data profiles associated with the principal user of the UE 110 as authorized by the p-token).

Figure 5:
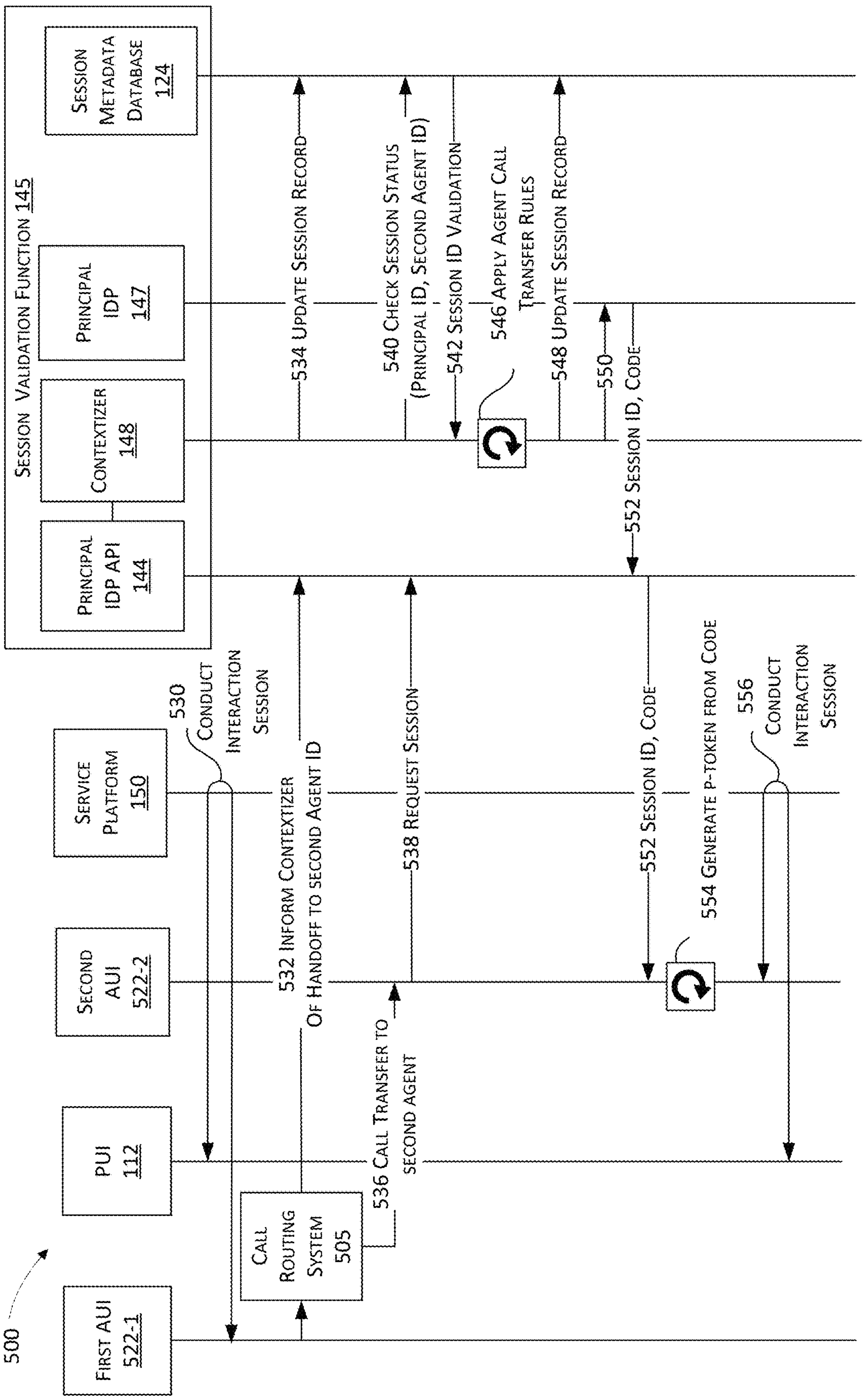
FIG. 5 is a diagram illustrating an example message exchange process for a call routing-based session handover process using a session metadata database, in accordance with some embodiments.

Turning now to FIG. 5, FIG. 5 illustrates a data flow diagram 500 for a process for a customer call interaction session handoff scenario, for example where a customer (e.g., the principal user) has called into a customer care system (e.g., by telephone and/or over a voice and/or video communication platform). The principal user may authenticate themselves via a PUI 112 on their UE 110 as illustrated in FIGS. 2A-2B to obtain a p-token, and instantiate a session with a first agent's UE, which provides the AUI 522-1 of the first agent's UE with the p-token (such as described with respect to FIG. 3). However, to complete the customer's request, the first customer care system agent may need to hand over the customer to a second customer care system agent—and therefore need to transfer the p-token from the AUI 522-1 of the first agent's UE to an AUI 522-2 of the second agent's UE. Unlike the use case scenario described with respect to FIG. 4, the first and second customer care agents may be physically located at different facilities (e.g., different call centers).

As shown in FIG. 5 at 530, a current interaction session may be in place between a first AUI 542-1 and the PUI 112, for example, via the service platform 150 (which may comprise an internal customer care platform or other call-based communications platform, in this example). The agent user of AUI 542-1 may need to hand off this session to a second agent user who is using the AUI 522-2 on their respective UE. The AUI 522-1 transmits a handoff message to a call routing system 505, and the call routing system 505 may in turn send a handoff message 532 to the principal IDP API 146 to inform the contextizer 148 of the planned handoff, and may provide an agent ID (or other call routing information) for the second agent. The contextizer 148 may update the session record at the session metadata database 124 (shown at 534) with the agent ID and additional metadata such as call routing information for the second AUI 522-2. The call routing system 505 may also transmit a call transfer initiation message (shown at 536) to the second AUI 522-2, informing the AUI 522-2 of the call transfer operation and the principal ID of the principal user whose session is being transferred to the second AUI 522-2. The AUI 522-2 receiving the handoff may transmit a session request/validation message 538 to the session validation function 145.

The principal IDP API may receive the session request/validation message 538 and instruct the contextizer 148 to check the session metadata database 124 (shown at 540) to obtain the session status for the session ID record that has been associated with the principal ID and the second agent's ID. If the session status check determines that such a valid active session ID does exist in the session metadata database 124, then the session metadata database 124 may transmit a session ID validation 542 to the contextizer 148. The contextizer 148 may apply location verification rules (shown at 546), for example to confirm that metadata indicates that the first AUI 422-1 and the second AUI 422-2 are both operating on care system authorized devices and/or at routing nodes associated with the customer care system. If confirmed, the contextizer 148 may update the session record (shown at 548) to record the call transfer event, and prompt the principal IDP 147 (shown at 550) to send a token generation code to the second AUI 522-2. The principal IDP 147 responds (as shown at 552) with a message to the principal IDP API 146 that includes the session ID and a code from which the AUI 522-2 can generate the p-token. The principal IDP API 146 forwards the session ID and code to the AUI 522-2 (shown at 552), from which the AUI 522-2 may generate the p-token from the code (shown at 554). Based on the p-token generated at the AUI 522-2, the AUI 522-2 now has obtained authenticating credentials for the PUI 112, and the AUI 522-2 and PUI 112 may establish an authenticated channel through the service platform 150 to conduct an interaction session 556, and/or perform other transactions of behavior of the principal user, such as accessing user data profiles 132 from the system of records 130 (e.g., user data profiles associated with the principal user of the UE 110 as authorized by the p-token).

Figure 6:
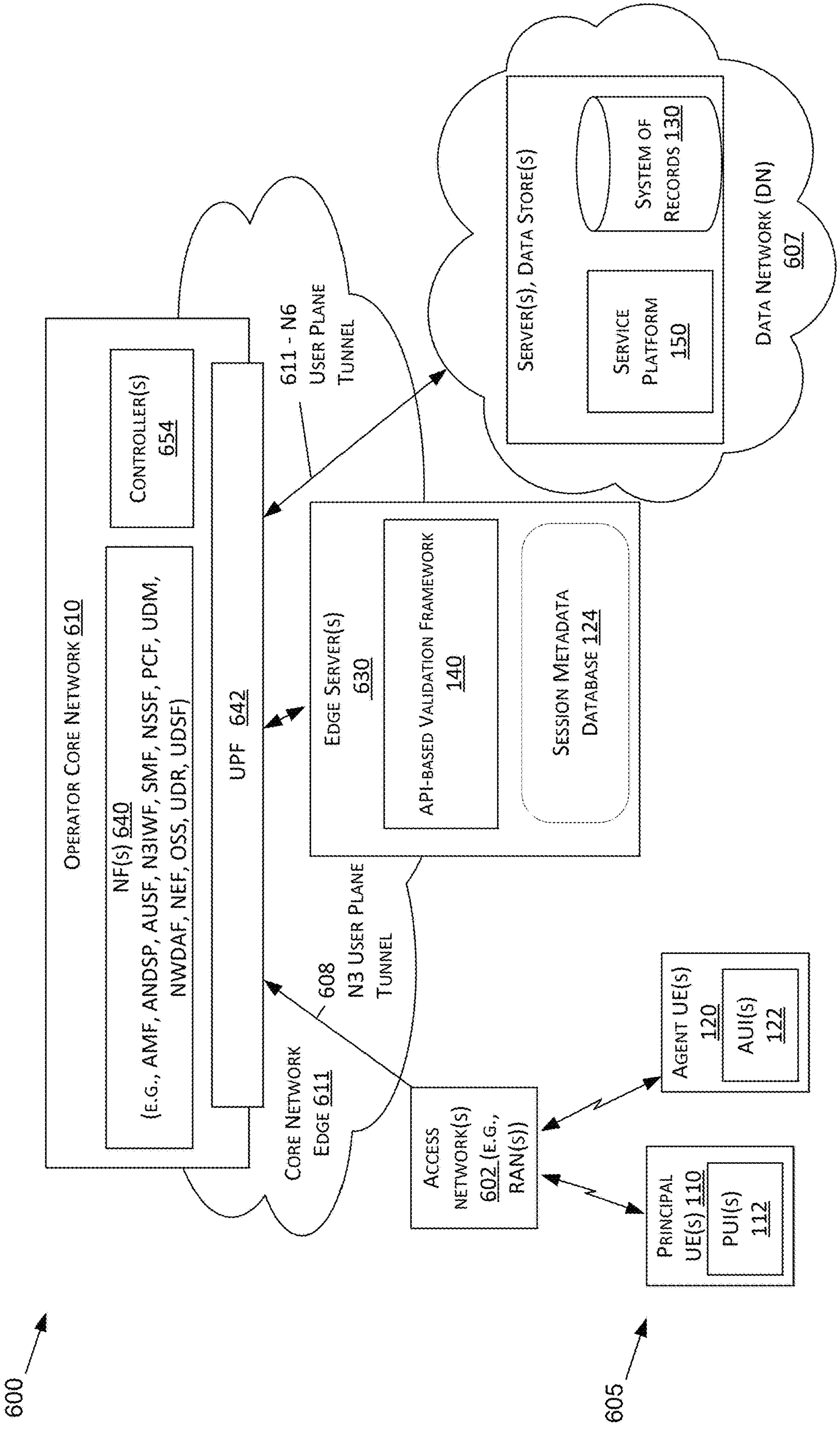
FIG. 6 is a diagram illustrating an example telecommunications network environment comprising a network function for providing a validation framework for user verification state sharing as a network service, in accordance with some embodiments.

Referring now to FIG. 6, FIG. 6 is a diagram illustrating an example telecommunications network environment 600 comprising a network function for providing a validation framework 140 (e.g., an API validation framework, as described herein) as a network service. FIG. 6 illustrates an example embodiment where the functions of an API-based validation framework 140 may be provided as a network service by at least one network function of a telecommunications network 600. For example, the at least one network function may respond to API calls from a UE 110 and/or UE 120 to establish and instantiate tokens, session IDs, and/or interactions sessions between a principal and agent user.

More specifically, FIG. 6 is a diagram illustrating an example network environment embodiment for a wireless communication system 600 that provides user verification state sharing for principal-agent-based session management. network environment 600 is but one example of a suitable telecommunications network and is not intended to suggest any limitation as to the scope of use or functionality of the embodiments disclosed herein, and nor should the network environment be interpreted as having any dependency or requirement relating to any one or combination of components illustrated.

As shown in FIG. 6, network environment 600 comprises an operator core network 610 (also referred to as a "core network") that provides one or more network services to one or more UEs 605 (which may include one or more principal UE(s) 110 and/or one or more agent UE(s) 120) via at least one access network 602, which may comprise a radio access network (RAN). In some embodiments, network environment 600 comprises, at least in part, a wireless communications network, such as, but not limited to, a 5G wireless communications network. In some embodiments, the access network(s) 602 of network environment 600 comprises one or more RANs, which may be referred to in the context of a wireless telecommunications network as a wireless base station, cell site, or cellular base station. At least one RAN may represent at least one wireless base station coupled to the operator core network 610 to establish one or more communication links between the operator core network 610 and UE 605. Each RAN may provide wireless connectivity access to one or more UEs 605 operating within one or more coverage areas associated with a particular RAN. The RAN may implement wireless connectivity using, for example, 3rd Generation Partnership Project (3GPP) technologies. The one or more of the access network(s) 602 may be referred to as an eNodeB in the context of a 4G Long-Term Evolution (LTE) implementation, a gNodeB in the context of a 5G New Radio (NR) implementation, or other terminology depending on the specific implementation technology. In some embodiments, access networks 602 may comprise, at least in part, components of a customer premises network, such as a distributed antenna system (DAS), for example. When an access network 602 is implemented as a RAN, the RAN may comprise a multimodal network (for example, comprising one or more multimodal access devices) where multiple radios supporting different systems are integrated into the RAN. Such a multimodal access network may support a combination of 3GPP radio technologies (e.g., 4G, 5G, and/or 6G) and/or non-3GPP radio technologies (e.g., Institute of Electrical and Electronics Engineers (IEEE) 802.11 (WiFi) and/or IEEE 802.15 (Bluetooth) access points). In some embodiments, access network(s) 602 may comprise a terrestrial wireless communications base station and/or may be at least in part implemented as a space-based access network, such as a base station implemented by an Earth-orbiting satellite. Individual UEs 605 may communicate with the operator core network 610 via the access network(s) 602 over one or both of uplink (UL) radio frequency (RF) signals and downlink (DL) radio frequency (RF) signals.

As shown in FIG. 6, access networks 602 may be coupled to the operator core network 610 via a core network edge 611 that comprises edge server nodes and wired and/or wireless network connections that may further include wireless relays and/or repeaters. The at least one access network may establish one or more communication links between the operator core network and one or more user equipment (UE). In some embodiments, the access networks 602 may be coupled to the operator core network 610 at least in part by a backhaul network such as the Internet or other public or private network infrastructure. Core network edge 611 may comprise one or more network nodes (e.g., servers) or other elements of the operator core network 610 that may define the boundary of the operator core network 610 and may serve as the architectural demarcation point where the operator core network 610 connects to other networks such as, but not limited to, access networks 602, the Internet, a Data Network (DN) 607, and/or other third-party networks. In some embodiments, the network edge 611 may comprise one or more network nodes that include at least one edge server 630. One or more edge server(s) 630 may provide, for example, edge-based network function services to UEs 605 that may be accessed separately from services provided by network functions of the operator core network 610. For example, edge server(s) 630 may host databases, caches, microservices, ledgers, decentralized applications (e.g., DApps), and/or may perform data traffic monitoring, inspections, and/or aggregation for other network functions of the network environment 600. As illustrated in FIG. 6, one or more functions of the API-based validation framework 140 described herein may be implemented as code executed by one or more processors (comprising processing circuitry) of one or more of the edge server(s) 630.

It should be understood that in some aspects, the network environment 600 may not comprise a distinct operator core network 610, but rather may implement one or more features of the operator core network 610 within other portions of the network, or may not implement them at all, depending on various carrier preferences.

As shown in FIG. 6, network environment 600 may also comprise at least one data network (DN) 607 coupled to the operator core network 610 (e.g., via the network edge 611). DN 607 may include one or more data stores and/or one or more cloud-based servers such that UE 605 may access services and/or content provided by the data store(s) and/or server(s) of DN 607. For example, in some embodiments, the DN 607 may comprise one or more servers that host the system of records 130 and/or service platform 150.

In some implementations, the operator core network 610 may comprise modules, also referred to as network functions (NFs), implemented by one or more processors and generally represented in FIG. 6 as NF(s) 640. Such network functions 640 may include one or more of, but not limited to, a core access and mobility management function (AMF), an access network discovery and selection policy (ANDSP), an authentication server function (AUSF), a user plane function (UPF), non-3GPP interworking function (N3IWF), a session management function (SMF), a network slice selection function (NSSF), a policy control function (PCF), a unified data management (UDM) function, a unified data repository (UDR), an unstructured data storage function (UDSF), a network data analytics function (NWDAF), a network exposure function (NEF), an operations support system (OSS), and/or other network functions. Implementation of these NFs 640 of the operator core network 610 may be executed by one or more controllers 654 on which these network functions are orchestrated or otherwise configured to execute utilizing processors and memory of the one or more controllers 654. The NFs may be implemented as physical and/or virtual network functions, container network functions, and/or cloud-native network functions, such as is described with respect to FIG. 9.

The user plane function (UPF), illustrated in FIG. 6 at 642, represents at least one function of the operator core network 610 that may extend into the core network edge 611. In some embodiments, the access network 602 is coupled to the UPF 642 within the core network edge 611 by a communication link that includes an N3 user plane tunnel 608. For example, the N3 user plane tunnel 608 may connect a cell site router of the access network 602 to an N3 interface of the UPF 642. The data store(s), server(s), and/or other elements of DN 607 (including, for example, the system of records 130 and/or service platform 150) may be coupled to the UPF 642 in the core network edge 611 by an N6 user plane tunnel 609. For example, the N6 user plane tunnel 609 may connect a network interface (e.g., a switch, router, and/or gateway) of the DN 607 to an N6 interface of the UPF 642. In some embodiments, the operator core network 610 may comprise a plurality of UPFs 642, such as a UPF at the operator core network 610 and a UPF at the core network edge 611. For example, a UPF at the core network edge 611 may be used for local breakout and/or low-latency types of applications via an N9 interface between the distinct UPFs.

In some embodiments, one or more aspects of a validation framework 140 may be implemented using one or more of the network functions 640 and provided to UE 605 as a network service offered from the operator core network 610 and/or edge server 630. In some embodiments, the session metadata database 124 may be implemented at least in part as a server-side service hosted, for example, by edge server(s) 630. In some embodiments, the PCF of the operator core network 610 maintains subscription information indicating one or more services and/or microservices subscribed to by each UE 605, including the API exposed services of the validation framework 140. In operation, a validation framework 140 provided as a network function service of the operator core network 610 and/or edge server 630 may operate in the same manner as any of the validation frameworks described herein. For example, in some embodiments, the validation framework 140, as a network function service, may receive via the at least one access network, a request message for a principal token, the principal token associated with a principal identification (ID) of an authenticated principal user. In response to the request for the principal token, the validation framework 140 may generate a first token generation code for the principal token and a session ID and transmit to the first UE, via the at least one access network, the first token generation code and the session ID, and create a session record in a server-side session metadata database (e.g., the session metadata database 124). The session record may comprise at least one of the session ID, the principal ID, and metadata provided by the request message. The validation framework 140 may perform a session status check, in response to a session verification message received via the network from a second UE, the session status check based at least on a query to the server-side session metadata database for the session record. The validation framework 140 may then transmit to the second UE, via the at least one access network, the second token generation code and the session ID, based on a result of the session status check.

Figure 7:
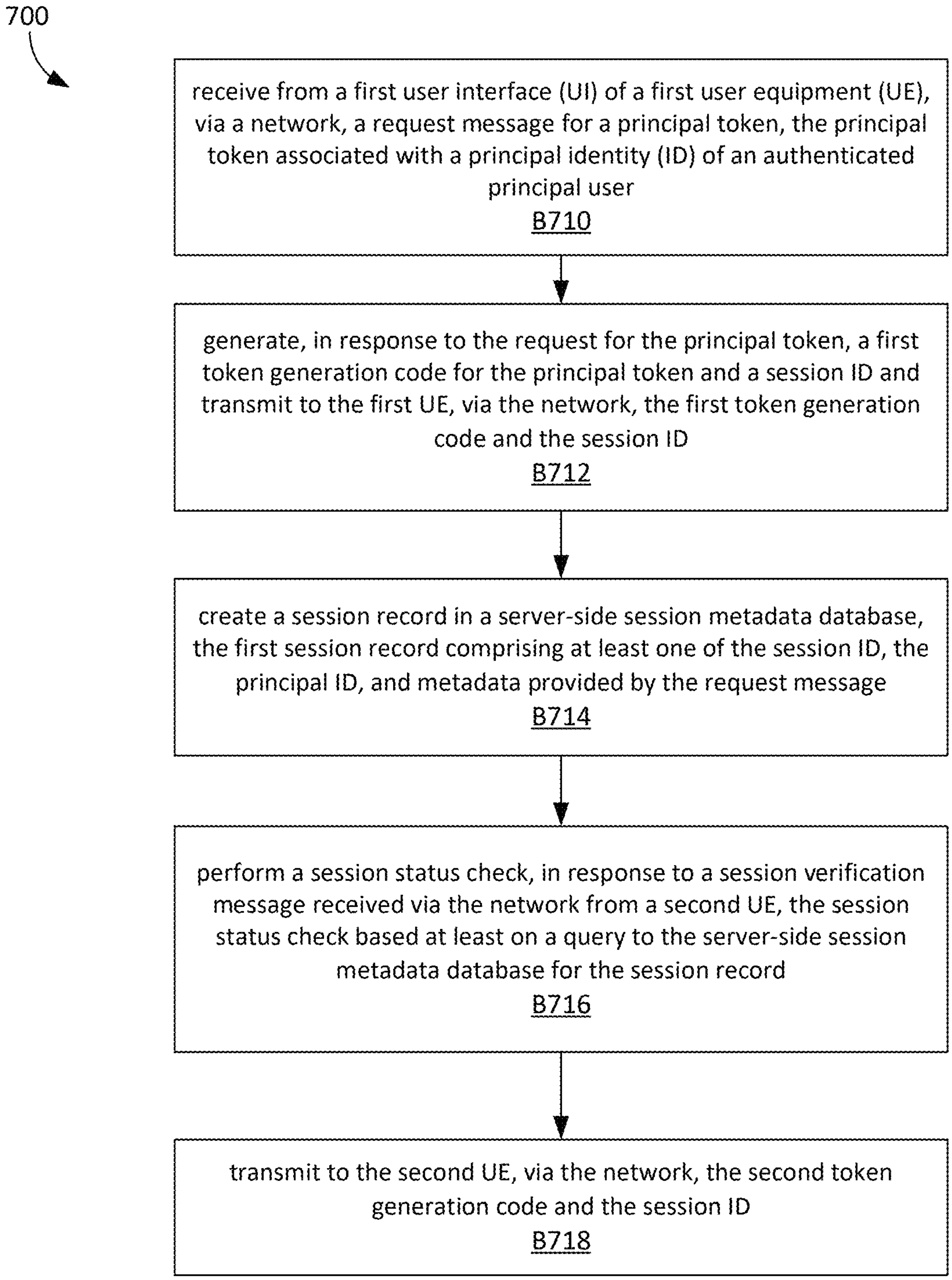
FIG. 7 is a flow chart illustrating an example method for user verification state sharing, according to some embodiments.

FIG. 7 is a flow chart illustrating a method 700 for user verification state sharing, according to some embodiments. It should be understood that the features and elements described herein with respect to the method of FIG. 7 may be used in conjunction with, in combination with, or substituted for elements of any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa. In some embodiments, elements of method 700 are implemented utilizing one or more processing units comprising processing circuitry, such as the controller of an operator core network, a network node, a network server, an edge server, an access network, a RAN, user equipment (UE), a computing device, a cloud computing environment, and/or other processing units or computing devices as disclosed in any of the embodiments herein. In some embodiments, the method 700 may be implemented by components of a telecommunications network environment 600, such as illustrated by FIG. 6.

The method 700, at B710, includes receiving from a first user interface (UI) of a first user equipment (UE), via a network, a request message for a principal token, the principal token associated with a principal identification (ID) of an authenticated principal user. In some embodiments, the authenticated principal user may be authenticated based at least on an authentication challenge, such as illustrated in FIG. 2A. As explained with respect to FIG. 2B, with the principal agent authenticated, the PUI API 144 has the principal ID and may proceed to request a p-token that will be used for authenticating interactions and establishing an interaction session (with a session ID) with the PUI 112. This part of the process commences with the PUI 112 communicating the principal ID (e.g., principal user credentials) to the PUI API 144, as shown at 208. The PUI API 144 may proceed to obtain a p-token by initiating a request message 209 to the session validation function 145, wherein the request message 209 includes the principal ID and may include OAuth credentials obtained from the authentication challenge 207. The request message 209 may be received at the principal IDP API 146, and proceed to validate the OAuth. If the principal IDP API 146 validates the OAuth, principal IDP API 146 may provide the principal ID to the principal IDP 147 as a credential for the principal user, as shown at 210. In some embodiments, when the principal ID comprises an AMR, the AMR and one or more AMR options may be provided to the principal IDP 147 as a credential for the principal user.

The method 700, at B712, includes generating, in response to the request for the principal token, a first token generation code for the principal token and a session ID and transmit to the first UE, via the network, the first token generation code and the session ID. When the principal ID is confirmed as valid, the principal IDP 147 establishes an interaction session that is assigned to the principal user. As shown at 212, the principal IDP 147 may then return a session ID and a code to principal IDP API 146 (where the code is a token code that may be used by the PUI 112 to generate the p-token). The code is issued specific to the principal user and tied to that user, and may include one or more security mechanisms. For example, in some embodiments the code may be encoded with an identity of the user that initiated the request message 209. In some embodiments, the p-token may indicate a scope of granted access to the system of records 130 (e.g., which profiles and/or which fields of a user data profile 132 may be accessed).

The method 700 at B714 includes creating a session record in a server-side session metadata database, the session record comprising at least one of the session ID, the principal ID, and metadata provided by the request message. In some embodiments, based on the session ID, the principal IDP API 146 and/or contextizer 148 may also forward the session ID to the session metadata database 124 (shown at 216) to generate a session object on the session metadata database 124 for storing the session ID and an initial set of session metadata. In some embodiments, the initial set of session metadata may comprise data associated with the PUI 112, such as an application ID. For example, an application ID may indicate if the PUI 112 is a messaging application, a special purposes client service application, a web browser application (e.g., Chrome, Edge, or Safari), a conferencing application (e.g., Zoom, Teams, etc.) and/or another application. In some embodiments, the initial set of session metadata may indicate a particular protocol, framework, communications parameters, or the like, that may be used to establish a session and/or communicate with the PUI 112. As discussed herein, the session metadata database 124 provides a server-side database (e.g., hosted by a cloud computing platform and/or network server) where session metadata for a plurality of distinct sessions may be stored. As indicated in FIG. 2C, the session metadata stored by the session metadata database 124 may include session data associated with one or more different principal IDs, and/or any may store metadata for one or more distinct sessions associated with each principal ID.

The method 700 at B716 includes performing a session status check, in response to a session verification message received via the network from a second UE, the session status check based at least on a query to the server-side session metadata database for the session record. The session verification message may include at least a representation of the principal ID and/or may further comprise an agent token associated with the second UE.

In response to having now been informed of the session instantiation (and the corresponding principal ID), the AUI 122 may verify the session with the contextizer 148—via the principal IDP API—as shown at 318. The contextizer 148 may reference the session metadata database 124 to confirm whether the session object (e.g., session record) for the session ID in the session metadata database is valid (e.g., not stale, not expired, and/or has a remaining lifetime greater than a threshold) or stale (e.g., expired and/or does not have a remaining lifetime greater than a threshold) before a token-generating code is transmitted to a UE.

The method may update the session record to include an ID associated with the second UE based on a message from a service platform, the message from a service platform associated with a request to instantiate a session for a communication channel between the first UE and the second UE via the service platform. In some embodiments, the session verification request 318 may include the principal ID, the agent's a-token, and/or OAuth credentials for the agent. The principal IDP API may receive the verification request 318 and instruct the contextizer 148 to check the session metadata database 124 (shown at 320) to obtain the session status for a session ID record that has been associated with the principal ID and agent ID. If the session status check determines that such a valid active session ID does exist in the session metadata database 124, then the session metadata database 124 may transmit a session ID validation 322 to the principal IDP 147, which responds with a message to the principal IDP API 146 (shown at 324) that includes the session ID and a code from which the AUI 122 can generate the p-token.

The method 700 at B718 includes transmitting to the second UE, via the network, the second token generation code and the session ID, based on a result of the session status check. The principal IDP API 146 forwards the session ID and code to the AUI 122 (shown at 326), from which the AUI 122 may generate the p-token from the code (shown at 328). Based on the p-token generated at the AUI 122, the AUI 122 now has obtained authenticating credentials for the PUI 112, and the AUI 122 and PUI 112 may establish an authenticated channel 330 through the service platform 150 to conduct an interaction session, and/or perform other transactions of behavior of the principal user, such as accessing user data profiles 132 from the system of records 130 (e.g., user data profiles associated with the principal user of the UE 110 as authorized by the p-token). In some embodiments, the method may update the session record to include an ID associated with a third UE based on a handoff message, and transmit to the third UE, via the network, a third token generation code and the session ID based at least on a query to the server-side session metadata database for the session record. As explained with respect to FIG. 4, the third token generation code and the session ID are transmitted to the third UE based at least in part on verifying a location of the third UE based on the metadata of the session record.

In some embodiments, the method may, as illustrated with respect to FIG. 5, update the session record to include an ID associated with a third UE based on a call transfer message from a call routing system of a telecommunications system, and transmit to the third UE, via the network, a third token generation code and the session ID based at least on a query to the server-side session metadata database for the session record.

Figure 8:
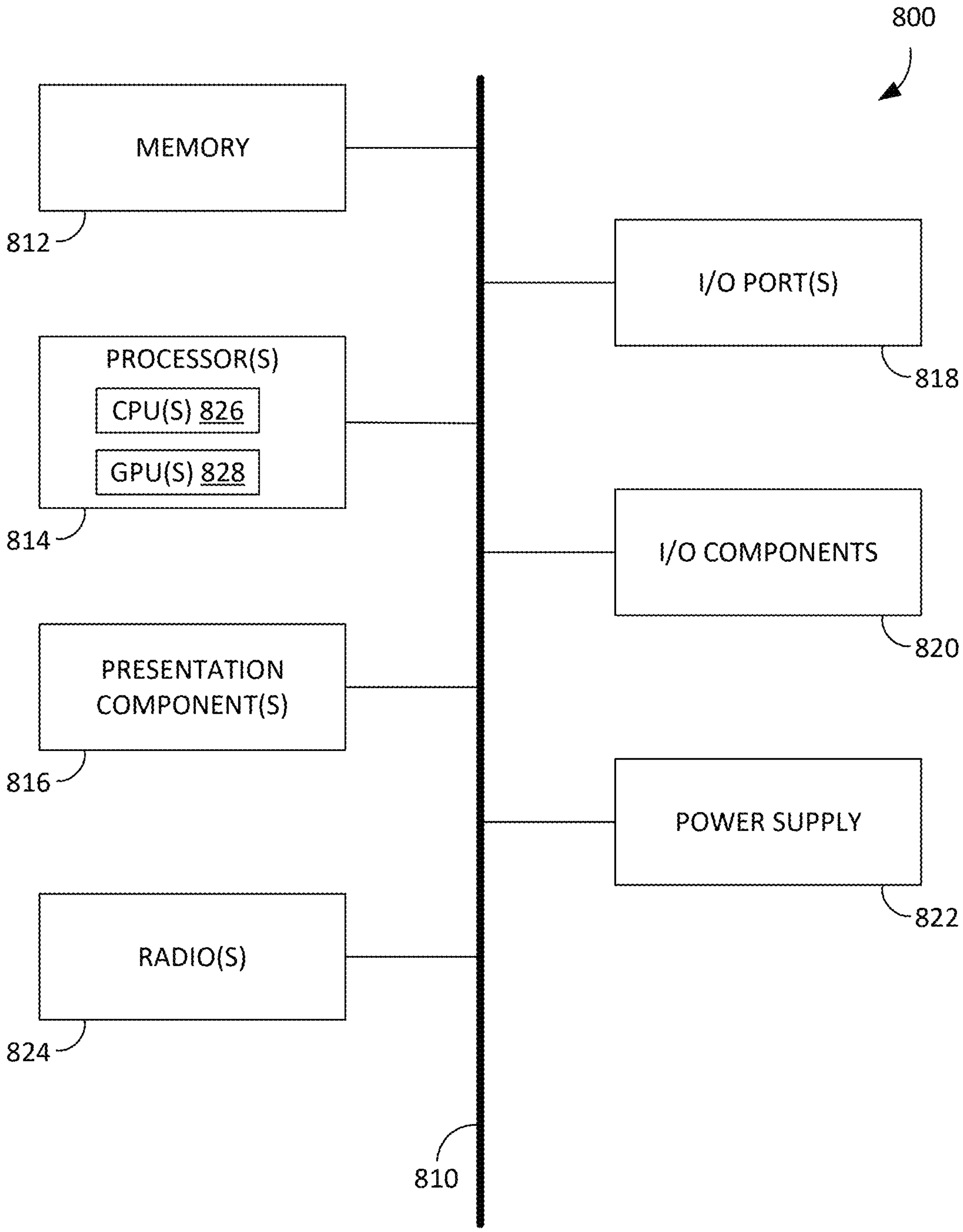
FIG. 8 is a diagram illustrating an example computing environment, in accordance with one embodiment.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the embodiments described herein, and nor should computing device 800 be interpreted as having any dependency or requirement relating to any one or combination of components illustrated. In various embodiments, one or more aspects of a UE 110, UE 120, session metadata database 124, and/or API-based validation framework 140 may be implemented at least in part using a computing device 800.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 810 that directly or indirectly couples the following devices: memory 812, one or more processors 814, one or more presentation components 816, input/output (I/O) ports 818, I/O components 820, power supply 822, and radio 824. Bus 810 represents what may be one or more buses (such as an address bus, data bus, or combination thereof). The devices of FIG. 8 are shown with lines for the sake of clarity. However, it should be understood that the functions performed by one or more components of the computing device 800 may be combined or distributed amongst the various components. For example, a presentation component such as a display device may be one of I/O components 820. In some embodiments, one or more functions of session metadata database 124 and/or API-based validation framework 140 may be executed at least in part by computing device 800. The processors 814 of computing device 800 may include a memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," "smart television," etc., as all are contemplated within the scope of FIG. 8 and refer to "computer" or "computing device."

Computing device 800 typically includes a variety of computer-readable media storing computer-usable instructions. For example, applications, algorithms, and/or neural networks may be stored in a memory comprising such computer-readable media. Computer-readable media can be any available media that can be accessed by computing device 800 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient random-access memory (RAM), read-only memory (ROM), electrically erasable programmable read-only memory (EEPROM), flash memory or other memory technology, compact disk (CD)-ROM, digital versatile disks (DVDs) or other optical disk storage, magnetic cassettes, magnetic tape, magnetic disk storage, or other magnetic storage devices. Computer storage media and computer-readable media do not comprise a propagated data signal or signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer-readable media.

Memory 812 includes computer storage media in the form of volatile and/or non-volatile memory. Memory 812 may be removable, non-removable, or a combination thereof. Exemplary memory includes solid-state memory, hard drives, optical-disc drives, etc. Computing device 800 includes one or more processors 814 that comprise processing circuitry and that read data from various entities such as bus 810, memory 812, and/or I/O components 820. Processors 814 may include one or more central processing units (CPUs) 826 and/or one or more graphics processing units (GPUs) 828. In some embodiments, one or more functions of a principal user interface 112, agent user interface 122, session metadata database 124, and/or API-based validation framework 140 described herein may include software code executed on CPUs 826 and/or GPUs 828. One or more presentation components 816 present data indications to a person or other device. Exemplary one or more presentation components 816 include a display device, speaker, printing component, vibrating component, etc. I/O ports 818 allow computing device 800 to be logically coupled to other devices including I/O components 820, some of which may be built into computing device 800. Illustrative I/O components 820 include a microphone, joystick, game pad, satellite dish, scanner, printer, wireless device, etc. In some embodiments, the I/O components 820 may include a network interface card (NIC) for coupling to a network, such as described herein.

Radio(s) 824 represents a radio that facilitates communication with a wireless telecommunications network (such as telecommunications network 500). For example, radio(s) 824 may be used to establish communications with components of a network 105, access network 602, operator core network 610, and/or core network edge 611. Illustrative wireless telecommunications technologies include code-division multiple access (CDMA), general packet radio service (GPRS), time-division multiple access (TDMA), global system for mobile communications (GSM), and the like. Radio(s) 824 may additionally or alternatively facilitate other types of wireless communications including Wi-Fi, WiMAX, LTE, and/or other voice-over-internet protocol (VoIP) communications. In some embodiments, radio(s) 824 may support multimodal connections that include a combination of 3GPP radio technologies (e.g., 4G, 5G, and/or 6G) and/or non-3GPP radio technologies. As can be appreciated, in various embodiments, radio(s) 824 can be configured to support multiple technologies, and/or multiple radios can be utilized to support multiple technologies. In some embodiments, the radio(s) 824 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 9:
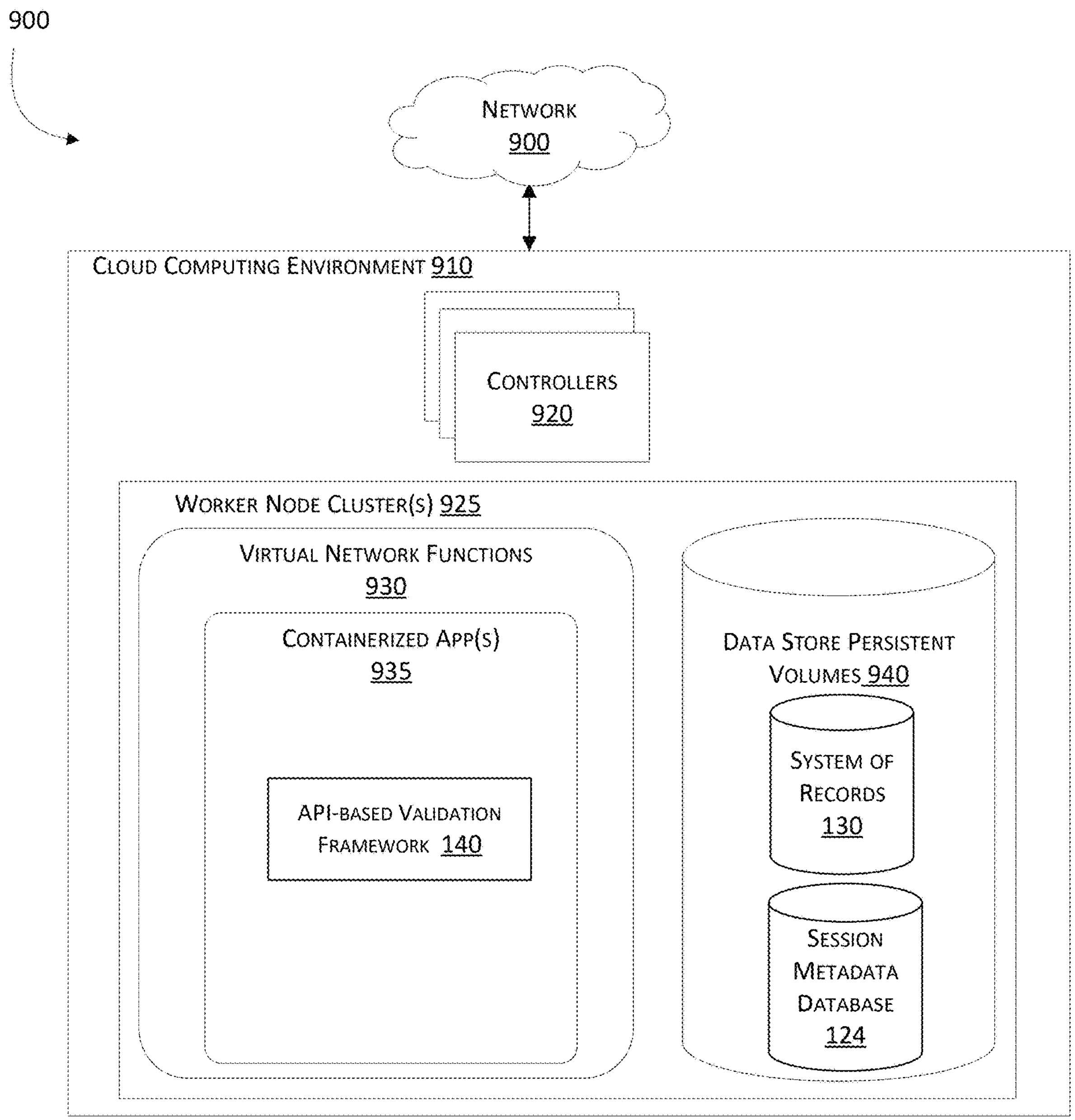
FIG. 9 is a diagram illustrating an example cloud computing environment, in accordance with some embodiments.

Referring to FIG. 9, a diagram is depicted generally at 900 of an exemplary cloud computing environment 910 for implementing one or more aspects of user verification state sharing for principal-agent-based session management, as implemented by the systems and methods described herein. Cloud computing environment 910 is but one example of a suitable cloud computing environment and is not intended to suggest any limitation as to the scope of use or functionality of the embodiments presented herein, and nor should cloud computing environment 910 be interpreted as having any dependency or requirement relating to any one or combination of components illustrated. In some embodiments, the cloud computing environment 910 is coupled to a network 900 (e.g., network 105) and/or may be executed within operator core network 610, the core network edge 611, edge server 630, or otherwise coupled to the core network edge 611 or operator core network 610.

Cloud computing environment 910 includes one or more controllers 920 comprising one or more processors and memory. The controllers 920 may comprise servers of a data center. In some embodiments, the controllers 920 are programmed to execute code to implement at least one or more aspects of an API-based validation framework 140, system of records 130, service platform 150 and/or session metadata database 124 as described herein. For example, in one embodiment a network function for a validation framework 140 as discussed herein may be implemented as one or more virtual network functions (VNFs) 930 (which may include one or more container network functions (CNFs) running on a worker node cluster 925 established by the controllers 920.

The cluster of worker nodes 925 may include one or more orchestrated Kubernetes (K8s) pods that realize one or more containerized applications 935. In other embodiments, another orchestration system may be used. For example, the worker nodes 925 may use lightweight Kubernetes (K3s) pods, Docker Swarm instances, and/or other orchestration tools. In some embodiments, one or more elements of the environment 100 may be implemented by, or coupled to, the controllers 920 of the cloud computing environment 910 by network 105, operator core network 610, and/or core network edge 611. In some embodiments, one or more elements of a system of records 130 and/or session metadata database 124 may be implemented at least in part using one or more data store persistent volumes 940 in the cloud computing environment 910.

In various alternative embodiments, system and/or device elements, method steps, or example implementations described throughout this disclosure (such as the UE, network nodes, servers, access networks, databases, core network edge, operator core network, network functions, validation frameworks, and/or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize the elements and/or processes, with said code stored on a non-transient hardware data storage device. Therefore, other embodiments of the present disclosure may include elements comprising program instructions resident on computer-readable media that when implemented by such computer systems enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random-access memory (RAM), or any other form of permanent, semi-permanent, or temporary memory storage system of a device having a physical, tangible form. Program instructions include, but are not limited to, computer-executable instructions executed by computer system processors and hardware description languages such as Verilog or Very High-Speed Integrated Circuit (VHSIC) Hardware Description Language (VHDL).

As used herein, the terms "network function," "framework," "processor," "controller," "unit," "model," "server," "node," and "module" are used to describe computer processing components and/or one or more computer-executable services being executed on one or more computer processing components. In the context of this disclosure, such terms used in this manner would be understood by one skilled in the art to refer to specific network elements and are not used as nonce words or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for multi-session agent authentication, the system comprising:
- one or more processors; and
- one or more non-transitory computer-readable media storing computer-usable instructions that when executed by the one or more processors cause the one or more processors to:
  - receive from a first user interface (UI) of a first user equipment (UE), via a network, a request message for a principal token, the principal token associated with a principal identification (ID) of an authenticated principal user;
  - generate, in response to the request for the principal token, a first token generation code for the principal token and a session ID and transmit to the first UE, via the network, the first token generation code and the session ID;
  - create a session record in a server-side session metadata database, the session record comprising at least one of the session ID, the principal ID, and metadata provided by the request message;
  - perform a session status check, in response to a session verification message received via the network from a second UE, the session status check based at least on a query to the server-side session metadata database for the session record; and
  - transmit to the second UE, via the network, the second token generation code and the session ID, based on a result of the session status check.

2. The system of claim 1, wherein the session verification message includes at least a representation of the principal ID.

3. The system of claim 1, wherein the session verification message further comprises an agent token associated with the second UE.

4. The system of claim 1, wherein the authenticated principal user is authenticated based at least on an authentication challenge.

5. The system of claim 1, wherein the one or more processors are further to:
- update the session record to include an ID associated with the second UE based on a message from a service platform, the message from the service platform associated with a request to instantiate a session for a communication channel between the first UE and the second UE via the service platform.

6. The system of claim 1, wherein the one or more processors are further to:
- update the session record to include an ID associated with a third UE based on a handoff message; and
- transmit to the third UE, via the network, a third token generation code and the session ID based at least on a second query to the server-side session metadata database for the session record.

7. The system of claim 6, wherein the third token generation code and the session ID are transmitted to the third UE based at least in part on verifying a location of the third UE based on the metadata of the session record.

8. The system of claim 1, wherein the one or more processors are further to:

update the session record to include an ID associated with a third UE based on a call transfer message from a call routing system of a telecommunications system; and transmit to the third UE, via the network, a third token generation code and the session ID based at least on a second query to the server-side session metadata database for the session record.

9. The system of claim 1, wherein the one or more processors are further to:

determine when the session record as stored in the server-side session metadata database is valid or stale based on an indication of lifetime.

10. A telecommunications network, the network comprising:

an operator core network;

at least one edge server of the operator core network coupled to a core network edge of the operator core network;

at least one access network coupled to the operator core network, wherein the at least one access network establishes one or more communication links between the operator core network and one or more user equipment (UE); and at least one network function for a validation framework executed on one or more processors of the at least one edge server, wherein the at least one network function is configured to:

receive from a first application of a first user equipment (UE), via the at least one access network, a request message for a principal token, the principal token associated with a principal identification (ID) of an authenticated principal user;

generate, in response to the request for the principal token, a first token generation code for the principal token and a session ID and transmit to the first UE, via the at least one access network, the first token generation code and the session ID;

create a session record in a server-side session metadata database, the session record comprising at least one of the session ID, the principal ID, and metadata provided by the request message;

perform a session status check, in response to a session verification message received via the network from a second UE, the session status check based at least on a query to the server-side session metadata database for the session record; and transmit to the second UE, via the at least one access network, the second token generation code and the session ID, based on a result of the session status check.

11. The network of claim 10, wherein the session verification message includes at least a representation of the principal ID.

12. The network of claim 10, wherein the session verification message further comprises an agent token associated with the second UE.

13. The network of claim 10, wherein the validation framework comprises:

a principal identity provider configured to generate the first token generation code for the principal token and the second token generation code for the principal token.

14. The network of claim 10, wherein the validation framework is further to:

update the session record to include an ID associated with the second UE based on a message from a service platform, the message from the service platform associated with a request to instantiate a session for a communication channel between the first UE and the second UE via the service platform.

15. The network of claim 10, wherein the validation framework is further to:

update the session record to include an ID associated with a third UE based on a handoff message; and transmit to the third UE, via the network, a third token generation code and the session ID based at least on a second query to the server-side session metadata database for the session record.

16. The network of claim 10, wherein the validation framework comprises:

a first application programming interface configured to communicate with the first application; and a second application programming interface configured to update the server-side session metadata database.

17. The network of claim 10, wherein the first UE generates the principal token based on the first token generation code received from the validation framework, and the second UE generates the principal token based on the second token generation code received from the validation framework.

18. A method comprising:

receiving from a first user equipment (UE), via a network, a request message for a principal token, the principal token associated with a principal identification (ID) of an authenticated principal user;

generating, in response to the request for the principal token, a first token generation code for the principal token and a session ID;

transmitting the first token generation code and the session ID to the first UE via the network;

generating a session record in a session metadata database, the session record comprising at least one of the session ID, the principal ID, and metadata provided by the request message;

performing a session status check, the session status check based at least on a query to the session metadata database for the session record; and transmitting to a second UE, via the network, the second token generation code and the session ID, based on a result of the session status check.

19. The method of claim 18, the method further comprising:

updating the session record to include an ID associated with the second UE based on a message representing a request to instantiate a session for a communication channel between the first UE and the second UE via a service platform.

20. The method of claim 18, the method further comprising:

updating the session record to include an ID associated with a third UE; and transmitting to the third UE, via the network, a third token generation code and the session ID based at least on a second query to the session metadata database for the session record.

* * * * *